(12) United States Patent
Burke et al.

(10) Patent No.: US 8,871,397 B1
(45) Date of Patent: Oct. 28, 2014

(54) ZERO EMISSION FUEL SYSTEM FOR USE WITH A FUEL CELL

(75) Inventors: A. Alan Burke, North Kingstown, RI (US); Louis G. Carreiro, Westport, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 770 days.

(21) Appl. No.: 13/078,217

(22) Filed: Apr. 1, 2011

(51) Int. Cl.
*H01M 8/06* (2006.01)

(52) U.S. Cl.
USPC .......................................... 429/416; 429/408

(58) Field of Classification Search
CPC ............ H01M 8/0606; H01M 8/0612; H01M 8/0668; C10H 19/00
USPC ......................................... 429/408, 416, 418
See application file for complete search history.

(56) References Cited

U.S. PATENT DOCUMENTS 5,955,040 A * 9/1999 Bunger et al. ................ 422/622

OTHER PUBLICATIONS

Burke A.A., Carreiro L.G., Greene E. "Carbide-based fuel system for undersea vehicles", Journal of Power Sources 176, pp. 299-305, available online Oct. 2007.*
Carreiro L.G., Burke A.A., Dubois L. "Co-generation of acetylene and hydrogen for a carbide-based fuel system", Fuel Processing Technology 91, pp. 1028-1032, available online May 2010.*

* cited by examiner

*Primary Examiner* — Milton I Cano
*Assistant Examiner* — Lilia V Nedialkova
(74) *Attorney, Agent, or Firm* — James M. Kasischke; Jean-Paul A. Nasser; Michael P. Stanley

(57) ABSTRACT

A self-contained fuel system for use with a high temperature fuel cell is described to address containment of carbon dioxide evolution. The system utilizes a slurry containing calcium carbide and calcium hydride that is pumped into a water reservoir. The resulting hydrolysis reaction generates acetylene, hydrogen and water-soluble calcium hydroxide. The acetylene and hydrogen are catalytically converted to synthesis gas, which is used by a fuel cell to generate electricity. Carbon dioxide exhaust from the fuel cell is reacted with calcium hydroxide to form a storable solid, calcium carbonate.

16 Claims, 1 Drawing Sheet

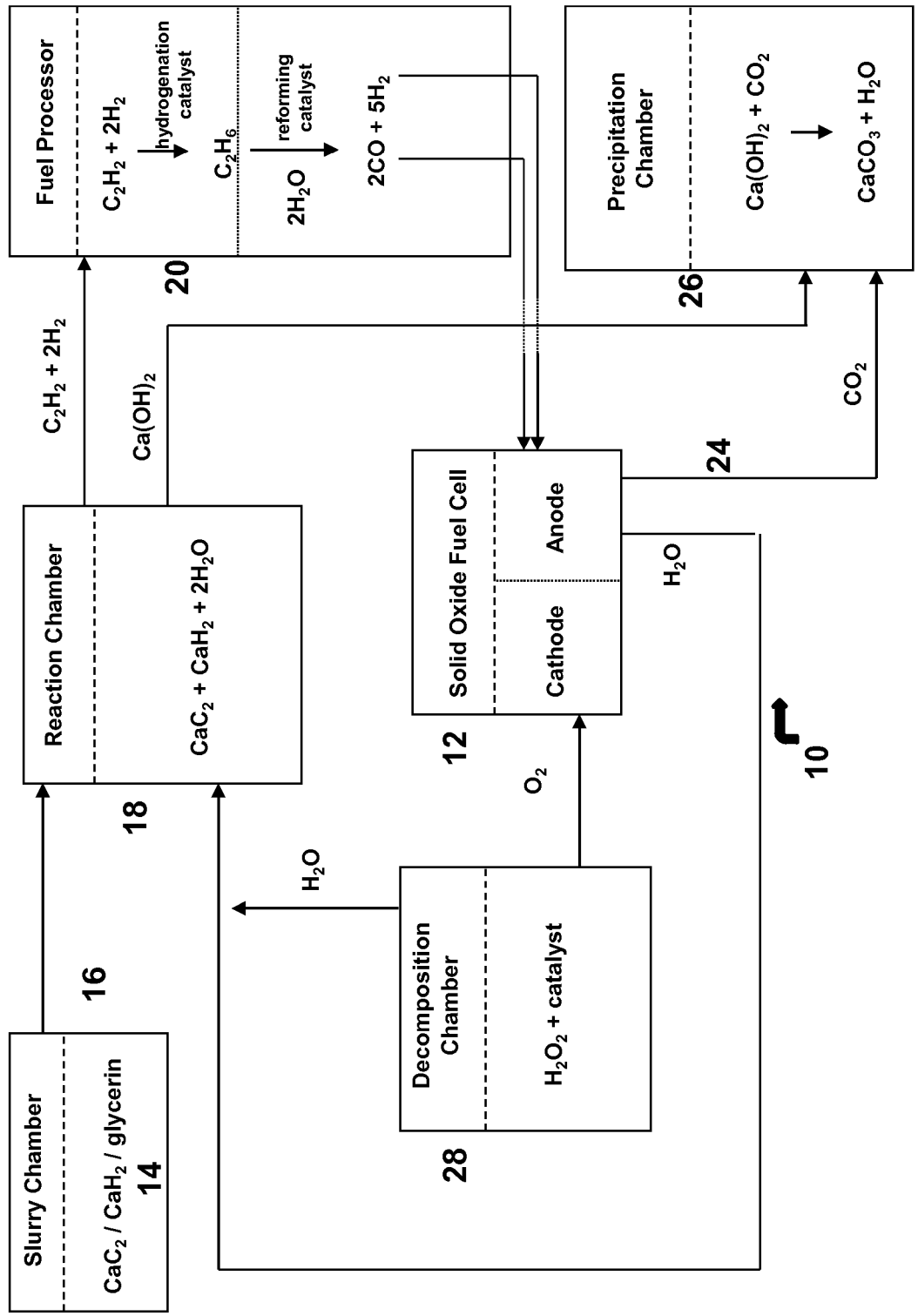

… … …

ZERO EMISSION FUEL SYSTEM FOR USE WITH A FUEL CELL

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

Not applicable.

BACKGROUND OF THE INVENTION (1) Field of the Invention

The present invention relates to fuel systems, and more specifically to a zero emission fuel system designed for use with power conversion devices such as fuel cells.

(2) Description of the Prior Art

The most logical choice of an energy source for an unmanned underwater vehicle would appear to be a battery, since it can be operated in the absence of air. However, most batteries lack sufficient energy density to carry out the long missions associated with unmanned undersea vehicles, and the few batteries that might find application, for example lithium thionyl chloride, are prohibitively expensive. There continues to be a need for energy sources with a high energy density that can power unmanned undersea vehicles. These energy sources need to have long endurance, quiet operation, be relatively inexpensive, environmentally friendly, safe to operate, reusable, capable of a long shelf life and not prone to spontaneous chemical or electrochemical discharge.

In an effort to develop power sources for unmanned undersea vehicles with increased energy density, research has been directed towards semi fuel cells and fuel cells as one of several high energy density power sources being considered. For larger scale unmanned underwater vehicles, and longer duration missions, proton exchange membrane fuel cells and solid oxide fuel cells are being used because they can be completely re-fueled from both a fuel and oxidizer standpoint.

A key requirement for an unmanned underwater vehicle powered by a solid oxide fuel cell is the ability to readily utilize synthesis gas (a mixture of hydrogen, carbon monoxide and methane) at high electrochemical conversion efficiency making the fuel cell a good candidate for use with a carbide-hydride fuel system. For this reason, what is needed is a solid oxide fuel cell fuel system that offers an innovative solution to address carbon dioxide evolution while using synthesis gas as a fuel component.

SUMMARY OF THE INVENTION

It is a general purpose and object of the present invention to provide a zero emission fuel system for use with power conversion devices to address carbon dioxide evolution.

It is a further object to have a solid oxide fuel cell as the power source in a self-contained fuel system.

These objects are accomplished by employing a chemical combination that when combined with water creates a fuel for the solid oxide fuel cell and a water soluble byproduct that can then be combined with the carbon dioxide gas generated by the fuel cell to create a storable solid precipitate.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1 is an illustration of the components of the self-contained fuel system of the present invention;

DETAILED DESCRIPTION OF THE INVENTION

Referring now to FIG. 1 there is illustrated a unique fuel system 10 that is intended for use with a high-temperature fuel cell that operates above 600° C., such as a solid oxide fuel cell 12. A low-temperature fuel cell like a proton exchange membrane (PEM) fuel cell would not be applicable since it cannot tolerate carbon monoxide in the fuel feed. A glycerin slurry 14 containing calcium carbide ($CaC_2$) and calcium hydride ($CaH_2$) is contained in a slurry chamber 16 and pumped into a reaction chamber 18 to react with water ($H_2O$). In a preferred embodiment, the slurry is comprised of calcium carbide and calcium hydride powders in mass ratios of approximately 3.8 to 2.5 of calcium carbide to calcium hydride. The powders are mixed together and then added to a volume of glycerin (liquid) to form slurry. The mixture is stored under argon and pumped into water $H_2O$ in the reaction chamber 18 (using a peristaltic pump) to co-generate acetylene $C_2H_2$ and hydrogen $H_2$. The use of calcium hydride is a key improvement over the prior art. It is an active ingredient, in that it produces hydrogen gas, which is later used in the fuel processing of acetylene. It also produces calcium hydroxide $Ca(OH)_2$, which traps $CO_2$ by converting it to calcium carbonate $CaCO_3$.

The use of glycerin offers two distinct advantages. First, it coats the carbide/hydride particles preventing water from immediately reacting with the particles. In doing so, the generation of acetylene and hydrogen is slowed making better control of the reaction possible. Secondly, it allows the carbide/hydride mixture to be pumped by containing it in a liquid medium rather than a powdered medium. The glycerin therefore moderates the rate of the highly exothermic reaction (above 100° C.) between the calcium carbide, calcium hydride and water, and provides an efficient means of delivering solid reactants to the reaction chamber 18. An uncontrolled highly exothermic reaction is not desirable since heat management becomes an issue. By pumping the slurry into a water reservoir, the heat generated by the reaction is absorbed by the water offering better thermal management of the system. The hydrolysis reaction generates acetylene gas ($C_2H_2$), hydrogen ($H_2$) and the byproduct calcium hydroxide ($Ca(OH)_2$). Hydrogen is used to hydrogenate acetylene to ethane $C_2H_6$. Acetylene cannot be directly reformed to synthesis gas. Since calcium hydroxide is in solution, no separation is required. The gases will eventually flow into the fuel processor The chemical reactions are illustrated in equation (1):

$$CaC_2 + CaH_2 + 4H_2 => C_2H_2 + 2H_2 + 2Ca(OH)_2 \qquad (1)$$

The byproduct calcium hydroxide, $Ca(OH)_2$ begins dissolving in the water immediately and is available as a reactant for subsequent reactions in a precipitation chamber 26.

In this embodiment, the acetylene and hydrogen resulting from equation (1) are converted in a fuel processor 20 to carbon monoxide (CO) and hydrogen in a two-step process. Acetylene is first reacted with hydrogen over a hydrogenation catalyst to form ethane, $C_2H_6$, as depicted in equation (2). The second step involves the steam reforming of ethane to synthesis gas, CO and $H_2$ shown in equation 3.

$$C_2H_2 + H_2 \Rightarrow C_2H_6 \quad (2)$$

$$C_2H_6 + 2H_2O \Rightarrow 2CO + 5H_2 \quad (3)$$

The CO and $H_2$ are fed to the solid oxide fuel cell where they undergo electrochemical oxidation according to equation (4):

$$2CO + 5H_2 + 7O^{2-} \Rightarrow 2CO_2 + 5H_2O + 14e^- \quad (4)$$

The $CO_2$ effluent is then directed via a hose 24 or some other device in combination with the system flow to the precipitation chamber 26 where it is then reacted with $Ca(OH)_2$ in solution to precipitate calcium carbonate ($CaCO_3$), which can be stored in solid form. The chemical reactions are illustrated in equation (5):

$$Ca(OH)_2 + CO_2 \Rightarrow CaCO_3 + H_2O \quad (5)$$

The liquid oxidant, hydrogen peroxide, $H_2O_2$, can be used as the oxygen, $O_2$, source in equation (2) for the solid oxide fuel cell. The hydrogen peroxide, $H_2O_2$, is decomposed over an appropriate catalyst in a decomposition chamber 28 connected to the reaction chamber 18 and the solid oxide fuel cell 12, to produce water and oxygen according to the reaction illustrated in equation (6):

$$2H_2O_2 \Rightarrow 2H_2O + O_2 \quad (6)$$

The water, $H_2O$, formed by this reaction can be used in equation (1) to convert the glycerin slurry 14 consisting of calcium carbide, $CaC_2$, and calcium hydride, $CaH_2$, to acetylene, $C_2H_2$, hydrogen, $H_2$, and calcium hydroxide, $Ca(OH)_2$, hence eliminating the need for carrying an additional source of water, $H_2O$.

The advantage of the present invention over the prior art is that it is a self contained, zero-effluent fuel system with three distinct features: (1 active fuel generating components comprising calcium carbide and calcium hydride; (2) the use of glycerin slurry as a medium for dispersing and delivering the reactants, calcium carbide and calcium hydride; (3) increased energy storage.

In light of the above, it is therefore understood that within the scope of the appended claims, the invention may be practiced otherwise than as specifically described.

What is claimed is:

1. A fuel system for use with a fuel cell that releases carbon dioxide $CO_2$ gas when operating, comprising:
   a slurry contained in a slurry chamber wherein said slurry is comprised of glycerin, calcium carbide powder $CaC_2$, and calcium hydride powder $CaH_2$;
   a reaction chamber joined to said slurry chamber wherein said slurry is pumped into the reaction chamber and reacted with water to generate a pre-fuel product and a byproduct, wherein said byproduct is to be combined with carbon dioxide $CO_2$ gas generated by a fuel cell;
   a fuel processor joined to said reaction chamber wherein said fuel processor receives the pre-fuel product that is catalyzed in two stages, first by a hydrogenation catalyst and then by a reforming catalyst, resulting in a fuel product for a fuel cell;
   a fuel cell joined to said fuel processor that receives the fuel product and generates carbon dioxide gas;
   a precipitation chamber joined to the reaction chamber and the fuel cell that receives the byproduct and the carbon dioxide gas generated by the fuel cell, wherein the carbon dioxide gas is reacted with the byproduct to form a storable solid precipitate in solution; and
   a means for directing the carbon dioxide $CO_2$ gas from the fuel cell into the precipitation chamber.

2. The fuel system of claim 1 further comprising:
   a liquid oxidant that is decomposed into water and oxygen in a decomposition chamber joined to the reaction chamber and the fuel cell, wherein said water is reacted with the chemical slurry and said oxygen is used in the fuel cell as the oxidant.

3. The fuel system of claim 1 wherein said pre-fuel product is acetylene $C_2H_2$ and hydrogen $H_2$.

4. The fuel system of claim 1 wherein said fuel product is carbon monoxide CO and hydrogen $H_2$.

5. The fuel system of claim 1 wherein said byproduct is calcium hydroxide $Ca(OH)_2$.

6. The fuel system of claim 1 wherein said storable solid precipitate is calcium carbonate $CaCO_3$.

7. The fuel system of claim 1 wherein said means for directing the carbon dioxide $CO_2$ gas from the fuel cell into a precipitation chamber comprises a hose joining said fuel cell to said precipitation chamber.

8. The fuel system of claim 1 wherein said fuel cell is a high-temperature solid oxide fuel cell.

9. A fuel system for an unmanned underwater vehicle for use with a high-temperature solid oxide fuel cell that releases carbon dioxide gas $CO_2$ when operating, comprising:
   a quantity of hydrogen peroxide $H_2O_2$ contained in a decomposition chamber, said hydrogen peroxide being decomposed over a catalyst to generate oxygen $O_2$ for use with a solid oxide fuel cell, and water $H_2O$;
   a slurry contained in a slurry chamber, said slurry comprising glycerin, calcium carbide powder $CaC_2$, and calcium hydride powder $CaH_2$;
   a reaction chamber joined to said slurry chamber wherein said slurry is pumped into the reaction chamber and reacted with the water $H_2O$ formed by the decomposition of the hydrogen peroxide to generate acetylene $C_2H_2$ and hydrogen $H_2$, for use as pre-fuel product and calcium hydroxide $Ca(OH)_2$ as a byproduct, wherein said byproduct can be reacted with carbon dioxide $CO_2$ gas generated by a solid oxide fuel cell;
   a fuel processor joined to said reaction chamber wherein said fuel processor receives the acetylene $C_2H_2$ and hydrogen $H_2$ that is catalyzed in two stages, first by a hydrogenation catalyst and then by a reforming catalyst, resulting in a fuel product of carbon monoxide CO and hydrogen $H_2$ for use as fuel for a solid oxide fuel cell;
   a solid oxide fuel cell joined to said fuel processor that receives carbon monoxide CO and hydrogen $H_2$ and generates carbon dioxide $CO_2$ gas;
   a precipitation chamber joined to the reaction chamber and the fuel cell that receives the calcium hydroxide $Ca(OH)_2$ and the carbon dioxide gas $CO_2$ generated by the fuel cell, wherein the carbon dioxide gas is reacted with the calcium hydroxide to form a storable solid precipitate of calcium carbonate $CaCO_3$ in solution; and
   a conduit joining the solid oxide fuel cell to the precipitation chamber for directing the carbon dioxide $CO_2$ gas from the solid oxide fuel cell into the precipitation chamber.

10. A method for containing carbon dioxide $CO_2$ gas in a fuel system having a fuel cell comprising the steps of:
    providing a chemical slurry wherein said chemical slurry is comprised of glycerin, powdered calcium carbide $CaC_2$, and powdered calcium hydride $CaH_2$;
    reacting said chemical slurry with water to produce a pre-fuel product and a byproduct for use in reacting with the carbon dioxide $CO_2$ gas;
    reforming said pre-fuel product into a fuel product for a fuel cell;

directing the byproduct to a precipitation chamber;

combining oxygen $O_2$ with said fuel product in a fuel cell to generate electricity, and thereby producing water $H_2O$, and carbon dioxide $CO_2$ gas;

directing the carbon dioxide $CO_2$ gas to the precipitation chamber; and reacting the byproduct with the carbon dioxide $CO_2$ gas to form a storable solid precipitate in solution.

11. A method in accordance with claim 10 further comprising the initial steps of:

providing a liquid oxidant; and decomposing said liquid oxidant over a catalyst to produce water and oxygen wherein said water is reacted with the chemical slurry and said oxygen is used in the fuel cell.

12. A method in accordance with claim 10 wherein said pre-fuel product is acetylene $C_2H_2$ and hydrogen $H_2$.

13. A method in accordance with claim 12 wherein the step of reforming the pre-fuel product into a fuel product comprises:

reacting said acetylene $C_2H_2$ and hydrogen $H_2$ over a hydrogenation catalyst to produce ethane $C_2H_6$; and reacting said ethane $C_2H_6$, with steam over a reforming catalyst to produce a fuel product that is carbon monoxide $CO$ and hydrogen $H_2$.

14. A method in accordance with claim 10 wherein said byproduct is calcium hydroxide $Ca(OH)_2$.

15. A method in accordance with claim 10 wherein said storable solid precipitate is calcium carbonate, $CaCO_3$.

16. A method in accordance with claim 10 wherein said fuel cell is a high-temperature solid oxide fuel cell.

* * * * *